(No Model.) 2 Sheets—Sheet 1.
J. CARDONA.
APPARATUS FOR MOLDING ORNAMENTAL WORK IN PAPIER MACHÉ AND OTHER MATERIALS.
No. 340,555. Patented Apr. 27, 1886.
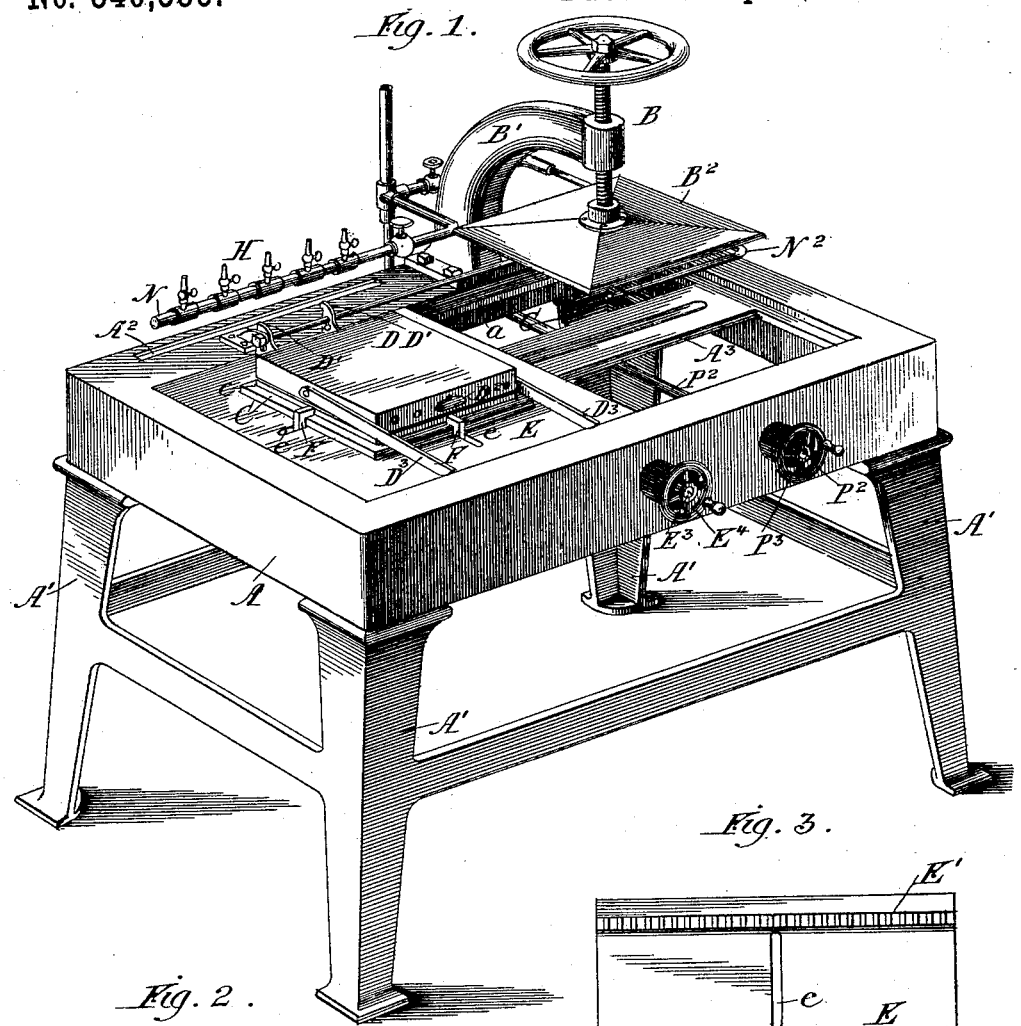
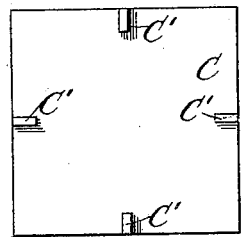
Witnesses:
Frank J. Blanchard
Frank W. Severin
Inventor:
Joseph Cardona
By Chas. G. Page
Attorney
N. PETERS, Photo-Lithographer, Washington, D. C.

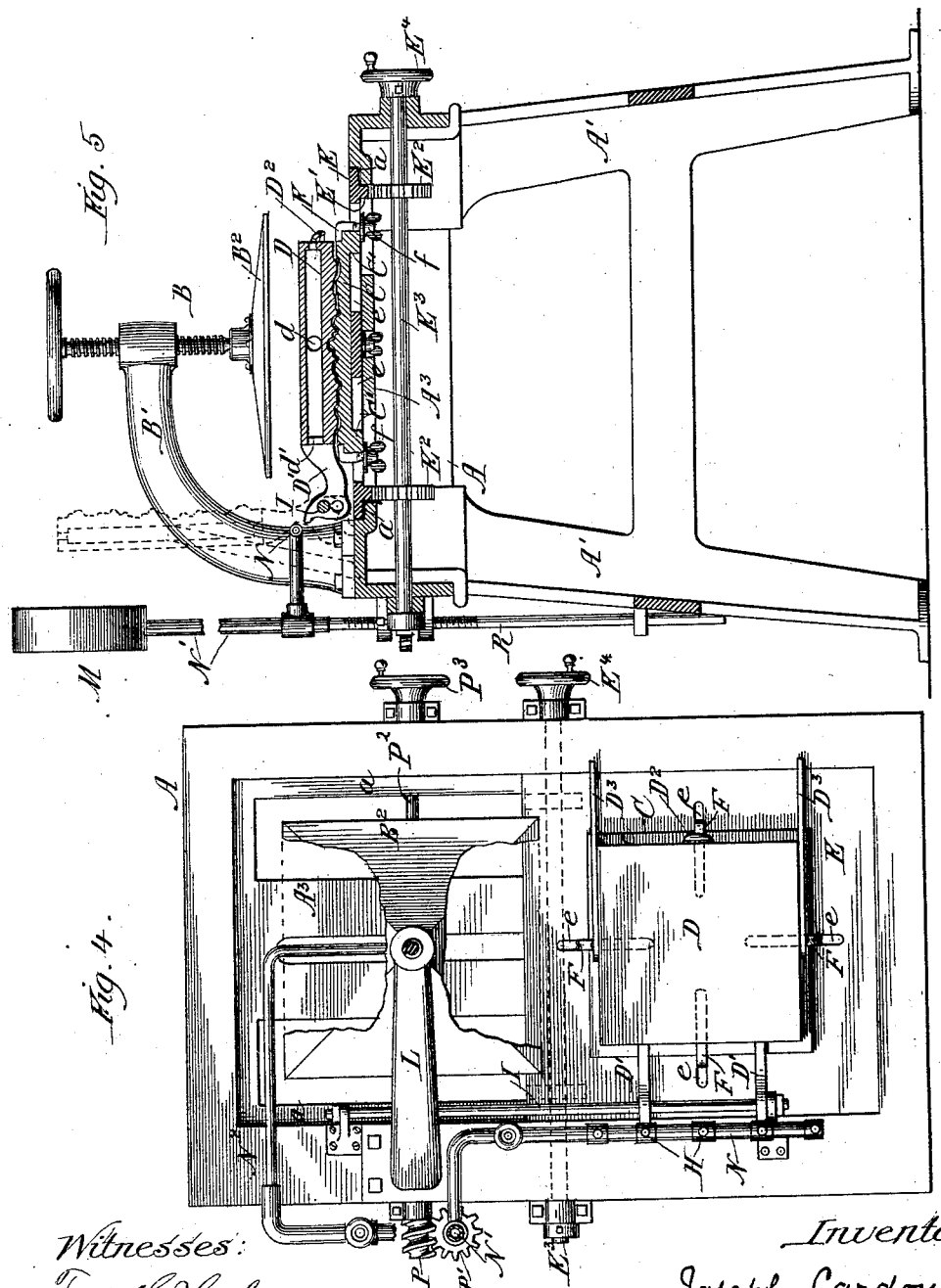

UNITED STATES PATENT OFFICE.

JOSEPH CARDONA, OF CHICAGO, ILLINOIS, ASSIGNOR OF ONE-HALF TO EDWARD BURKHARDT, OF SAME PLACE.

APPARATUS FOR MOLDING ORNAMENTAL WORK IN PAPIER-MACHÉ AND OTHER MATERIAL.

SPECIFICATION forming part of Letters Patent No. 340,555, dated April 27, 1886.

Application filed September 21, 1885. Serial No. 177,643. (No model.)

*To all whom it may concern:*

Be it known that I, JOSEPH CARDONA, a citizen of the United States, residing at Chicago, in the county of Cook and State of Illinois, have invented certain new and useful Improvements in Apparatus for Molding Ornamental Work in Papier-Maché and other Material, of which the following is a specification.

Heretofore articles molded from plastic material, and especially the pieces designed for interior decoration, have been made with an undesirable amount of hand manipulation and by a process involving considerable time, as well as the exercise of great care, skill, and attention. Various materials have been employed in the production of pieces for interior decoration, among which may be mentioned the well-known plastic material consisting of paper-pulp, which, when hardened, forms what is commonly known as "papier-maché." These pieces are usually formed by hand-work while the material is in a wet plastic condition, after which the pieces are set away to dry.

The object of my invention is to lessen the cost, time, and labor necessary to produce articles of such character, and to provide means whereby the pieces can be readily molded and dried; also, to provide means whereby the production of a wide range of designs is facilitated and rendered more practicable than heretofore, and the multiplication of one or more forms of design reduced to a simple and easy process.

To such end I have constructed an apparatus embodying a male and female die or a die and a matrix, so arranged that the material can be readily placed, while in a plastic condition, between the two, and then both shifted into a press, whereby the requisite degree of compression may be effected. Means are provided for heating the upper die preparatory to bringing it down upon the material, and means are also provided for keeping the die up to the proper degree of heat after introduction into the press, in which way the material which is molded under pressure will be readily dried. The dies are also removable, so that they can be replaced by dies of different design, and certain details, hereinafter described, tending to increase the general efficiency of the apparatus, are employed.

In the drawings, Figure 1 represents in perspective an apparatus embodying the principles of my invention. Fig. 2 is a plan view of the bottom side of the lower die or matrix. Fig. 3 is a bottom plan view of a reciprocatory bed, upon which the lower die or matrix is to be supported. Fig. 4 represents a top plan view of the apparatus with the movable clamp-plate or platen of the press partly broken away, the screw of the press broken away just above the goose-neck standard, and with the oil-reservoir removed and a portion of the pipe that leads under the press-platen likewise broken away, for convenience of illustration. Fig. 5 is a transverse section through the preceding figure, with the upper portion of the press shown in elevation. This section is taken on a vertical plane at one side of the press, with the die-carrier likewise in section, the latter being supposed to have been moved to some extent toward the press, so as to bring it in the plane on which this section is taken.

The support for the several operative members of the apparatus consists of a table or bed-frame, A, provided with legs A', of suitable height to bring the devices that are supported by the bed-frame within convenient reach of the operator.

The press B is arranged to operate near one end of the table or bed-frame, and the dies C and D are arranged to be moved along the bed-frame toward either end thereof, so that they can be either brought under the press or shifted to one side of the same.

The lower die, C, is detachably secured to and upon a sliding bed or base-plate, E, which latter is fitted to slide along the bed-frame A, whereon it is guided in any suitable way. For example, the bed-frame can be provided with guideways $a$ along its front and rear inner side edges, to receive the front and rear side edges of the sliding base-plate. As a means for shifting this base-plate so as to either bring the dies under or to one side of the press, the base-plate is provided on its under side with one or more, but preferably with two, parallel lines of rack-teeth, E', that are engaged by pinions $E^2$ upon a spindle, $E^3$. This spindle is mounted in the bed-frame, and is at one end extended out from the front side of the bed-frame, and provided with a crank-handle or hand-wheel, $E^4$, so that it can be readily operated by an attendant standing in front of the apparatus.

As a means for centering and attaching the lower die-block or die-plate, C, to the sliding bed E, the latter is provided with four slots, $e$, radiating from a common center, and the lower die-plate is provided on its under side with four short ribs, C', adjacent to the edges of the die-plate and arranged in correspondence with the grooves of the sliding bed. By such means, when the die-plate is seated upon the sliding bed, with its ribs in coincidence with and fitted into the several slots, the die-plate will necessarily be centered and also prevented from shifting out of its proper position upon the sliding bed.

To fasten the die-plate down upon the sliding bed, clamps F are herein provided. These clamps consist of short angle-pieces, which can be caught at their upper ends on a shoulder, $c$, extending around the die-plate, the angle-pieces thus engaging the die-plate being extended down through the slots of the sliding bed and provided at their lower ends with nuts $f$, which can be tightened up against the under side of the sliding bed, as in Fig. 5.

The upper die, D, is formed by a metal shell or box, which is provided on its under side with a die-face of the desired design. This box is provided at one end and along one side with a suitable opening, the one to provide a passage, $d$, Fig. 5, which permits a burner, G, to enter the box or hollow die when the latter is moved under the press, and the other to provide a passage, $d'$, which, when the box is brought into the raised position indicated by dotted lines, Fig. 5, will permit the flames from a set of burners, H, to enter the die in order to heat the same.

To permit the upper hollow die to be raised from the lower die and brought into position to be properly heated by the flames from burners H, the shallow box-shaped body of the upper die is provided along its rear edge or side with hooks or arms D', which are hung upon a horizontal guide-rod, I. This guide-rod is supported from the bed-frame and arranged in front of the set of burners H in such relative position thereto that the upper hollow die can be either let down upon the lower die, as in Figs. 1, 4, and 5, or swung up into position to bring its side opening, $d'$, directly over the said set of burners, as indicated in dotted lines, Fig. 5. The guide-rod also extends substantially the length of the bed-frame, so that when the upper die is down and the sliding bed shifted under the press the upper die will be carried along with the sliding bed, and its arms D' be permitted to slide along the guide-rod.

The upper hollow die is provided with a handle, $D^2$, at the front, whereby it can be readily raised and lowered, and as a means for supporting or maintaining it in its raised position it can be provided with pivoted arms or legs $D^3$, which, when it is in a raised position, will drop and engage at their free ends in a groove or seat, $A^2$, Fig. 1, formed along the bed-frame.

The press is supported upon the bed-frame, and is within convenient reach of an attendant standing in front of the apparatus.

The construction of the press and the mode of operating its plunger or platen can obviously be varied—as, for example, any of the known forms of screw or lever actuating devices can be employed.

The arrangement herein shown consists simply of a goose-neck, B', secured upon the bed-frame, and a platen, $B^2$, which is raised and lowered by a screw arranged to work through the upper end of the goose-neck.

The burners are supplied from any suitable source, and can be either of the gasoline type or of the common gas-burner construction.

As an illustration of one of the several ways in which the burners may be supplied, I have herein shown a reservoir, M, for gasoline or the like, supported in an elevated position at the rear of the apparatus. The burners H are arranged in series upon a horizontal pipe, N, that is arranged over the rear portion of the bed-frame and coupled to a pipe, N', upon which the reservoir is supported. The pipe N is situated at one side of the press, while at the opposite side of the press is a pipe, $N^2$, likewise coupled to the supply-pipe N', and bent round so as to extend under the press-platen to bring a burner, G, at its forward end into position to enter the hollow upper die when the latter is moved under the press. The burners H and G can be raised and lowered at will, so as to place and maintain them at a proper height relatively to such die as may be in use. To this end a raising and lowering mechanism is provided and organized so that it can be operated by an attendant standing in front of the apparatus. A simple and convenient construction of mechanism for such purpose consists of a worm, P, Fig. 4, engaging a worm-wheel, P', that is formed and applied to operate as a nut upon a threaded slide-rod, R, Fig. 5, by which the several pipes of the burners and reservoir are sustained. The worm P is provided with a stem, $P^2$, consisting of a rod arranged transversely to the bed-frame and passing through the front and rear sides of the same, the worm being on the rear end of the stem, and a hand-wheel, $P^3$, being upon the forward end of the same. The slide-rod R is arranged vertically at the rear of the apparatus, and works through appropriate bearings upon the main frame.

The bed-frame is desirably provided with longitudinal slats $A^3$, which assist in supporting the sliding bed, and which also support the same in opposition to the downward pressure exerted by the press.

The upper hollow die can be removed and replaced by another, as may be desired, provision being made, if preferred, for detaching arms D' from the guide-rod without disturbing the rod; or the nut herein shown on one end of the rod can be detached and the rod slipped through its bearings A⁴ to an extent sufficient to permit the arms to be slipped from off the rod.

In operating this apparatus the upper hollow die is first raised, so as to be heated, over the burners H. The plastic material is placed upon the lower matrix or lower die, and the upper die is then brought down upon the said material. The operator will then shift the sliding bed so as to bring the dies under the press, the burner G being at such stage of the operation received within the upper hollow die, so as to maintain the same up to a proper heated condition. The dies being under the press, the operator will bring down the latter upon the upper die with a degree of force sufficient to mold the material between the two opposing die-faces, and, owing to the heated condition of the upper die, the material will rapidly set and harden, so that the molded or pressed piece can be taken out and the operation repeated, it being obvious that the sliding bed can be readily shifted from under the press, and the upper die removed, so as to permit the piece to be removed. By heating only the upper die the material placed upon the lower die will retain its plastic or softened condition until after the upper die has been brought down upon the same; and hence while the upper die is being heated over the burners H the operator can be spreading the material properly upon the lower die. As soon as the upper heated die has been brought down upon the material, the apparatus must be worked so as to shift the dies into the press, and the latter then operated to apply the proper pressure.

The burners H can, if desired, be adjustable in position upon the pipe, so that they may be set closer together or moved farther apart with reference to the interior area of the upper hollow die; but since means for adjusting the burners will readily suggest themselves no special illustration thereof is herein made; also, it will be obvious that while but one burner could be employed, two or more burners will be found more desirable.

The upper die is herein represented as composed, in effect, of a shallow box, designed to be formed of metal, and the die-face, in place of being detachable from this box, which is more properly the body of the die, is, for convenience, made integral therewith. The foregoing will, however, indicate that various modifications in details could be made without departing from the spirit of my invention.

With regard to the material to be molded, I do not confine myself to any particular substance, but mention as an example paper-pulp, which is molded while in a plastic condition, and then dried, so as to harden it.

What I claim as my invention is—

1. An apparatus for molding ornamental work, provided with a press and a sliding die carrier or bed arranged to be shifted into or out from the press, substantially as described.

2. An apparatus for molding ornamental work, provided with a press, a shifting die bed or carrier, and means suitable for heating the upper one of two dies carried by the die-bed, the said die-bed being arranged to permit the dies to be shifted into and out from the press, substantially as described.

3. The shifting bed carrying a stationary lower die or matrix and a swinging upper hollow die, in combination with one or more burners situated to permit the flame or flames therefrom to heat the upper hollow die when the latter is in a raised position, substantially as described.

4. The lower die or matrix and its sliding support, in combination with the upper die, D, hung to slide along and turn upon a guide-rod, and means suitable for heating the upper die after it has been raised from the lower die or matrix, substantially as described.

5. The sliding bed E, provided with the radially-arranged slots, combined with the lower die or matrix provided with ribs adapted to fit into the slots of the said bed, whereby the position of the die or matrix is insured, substantially as set forth.

6. The radially-slotted bed E, combined with the lower die, C, provided with ribs to fit the slots of the bed, and clamps F, adapted to secure the die in rigid connection with the bed, substantially as described.

7. The combination, with the bed-frame, of the sliding die-bed E, provided with one or more racks, the geared spindle for reciprocating the sliding bed, and a press situated in the path of the sliding bed, substantially as described.

8. The combination, with the lower die carried by a sliding support, of the upper hollow die hung upon and adapted to slide along a stationary guide, and the burners H, in position for heating the hollow upper die when the latter is in a raised position at one side of a press, which is arranged to act upon the upper die after the latter has been lowered and shifted, substantially in the manner described.

9. The combination, with the press, of the dies and a sliding support arranged to move the dies into or out from the press, and the burners for heating the upper die, adjustably supported, whereby they can be raised and lowered, substantially as described.

10. The combination, with the sliding die-bed and the upper hollow die, of a burner arranged below the platen of a press in position to enter the hollow die when the die-bed is adjusted into position to bring the latter under the press-platen, substantially as described.

11. The combination, with the press, the sliding die-bed, and the dies, of the vertically-adjustable burners, the worm-gear for raising and lowering the burners, and the spindle E³, supported by the main frame and available from the front side of the same, substantially as described.

12. The combination, with the press having its platen arranged over a bed-frame, of the reciprocating die-bed applied to slide under and to one side of the press-platen, a lower die or matrix attached to the sliding die-bed, an upper hollow die, and means suitable for heating the upper hollow die preparatory to and after its removal from one side of to a point under the press-platen, substantially as described.

JOSEPH CARDONA.

Witnesses:
CHAS. G. PAGE,
FRANK W. SEVERIN.